United States Patent
DeCusatis et al.

(10) Patent No.: US 9,456,036 B2
(45) Date of Patent: *Sep. 27, 2016

(54) SWITCH-BASED DATA TIERING

(71) Applicant: International Business Machines Corporation, Armonk, NY (US)

(72) Inventors: Casimer DeCusatis, Poughkeepsie, NY (US); Sujatha Kashyap, Austin, TX (US); Rajaram B. Krishnamurthy, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,259

(22) Filed: Aug. 14, 2015

(65) Prior Publication Data

US 2015/0350327 A1   Dec. 3, 2015

Related U.S. Application Data

(63) Continuation of application No. 14/104,832, filed on Dec. 12, 2013.

(51) Int. Cl.
  *G06F 15/16* (2006.01)
  *H04L 29/08* (2006.01)
  *G06F 15/167* (2006.01)

(52) U.S. Cl.
  CPC ......... *H04L 67/1097* (2013.01); *G06F 15/167* (2013.01)

(58) Field of Classification Search
  CPC ............... H04L 29/08072; H04L 29/06095
  USPC ........................................................ 709/216
  See application file for complete search history.

(56) References Cited

U.S. PATENT DOCUMENTS

| | | | |
|---|---|---|---|
| 6,799,251 B1 * | 9/2004 | Jacobs | G06F 17/30902 707/E17.12 |
| 8,037,127 B2 | 10/2011 | Alstad | |
| 2009/0204753 A1 * | 8/2009 | Bridge, Jr. | G06F 12/122 711/106 |
| 2012/0179975 A1 * | 7/2012 | Steelberg | G06Q 30/02 715/747 |
| 2013/0254325 A1 * | 9/2013 | Song | G06F 17/3048 709/213 |
| 2014/0098823 A1 * | 4/2014 | Kapadia | H04L 49/10 370/412 |
| 2014/0229945 A1 * | 8/2014 | Barkai | H04L 49/70 718/1 |

FOREIGN PATENT DOCUMENTS

WO   2012074268 A2   6/2012
WO   WO 2012074268 A2 *  6/2012   ......... H04L 67/1097

* cited by examiner

*Primary Examiner* — Vivek Srivastava
*Assistant Examiner* — Atta Khan
(74) *Attorney, Agent, or Firm* — Cantor Colburn LLP; Steven Chiu

(57) ABSTRACT

Embodiments include a method, system, and computer program product for allocating data to storage in a network. A data item accessed by a server in the network is identified. A controller classifies the identified data item based on at least one of: a frequency of access requests for the data item by the server and an access time associated with providing the data item to the server once the server requests the data item. A memory of a switch in the network is selected for storing the data item based on the classification of the data item. The controller causes the data item to be stored in the memory of the switch, from which the data item is accessed by the server upon request.

6 Claims, 3 Drawing Sheets

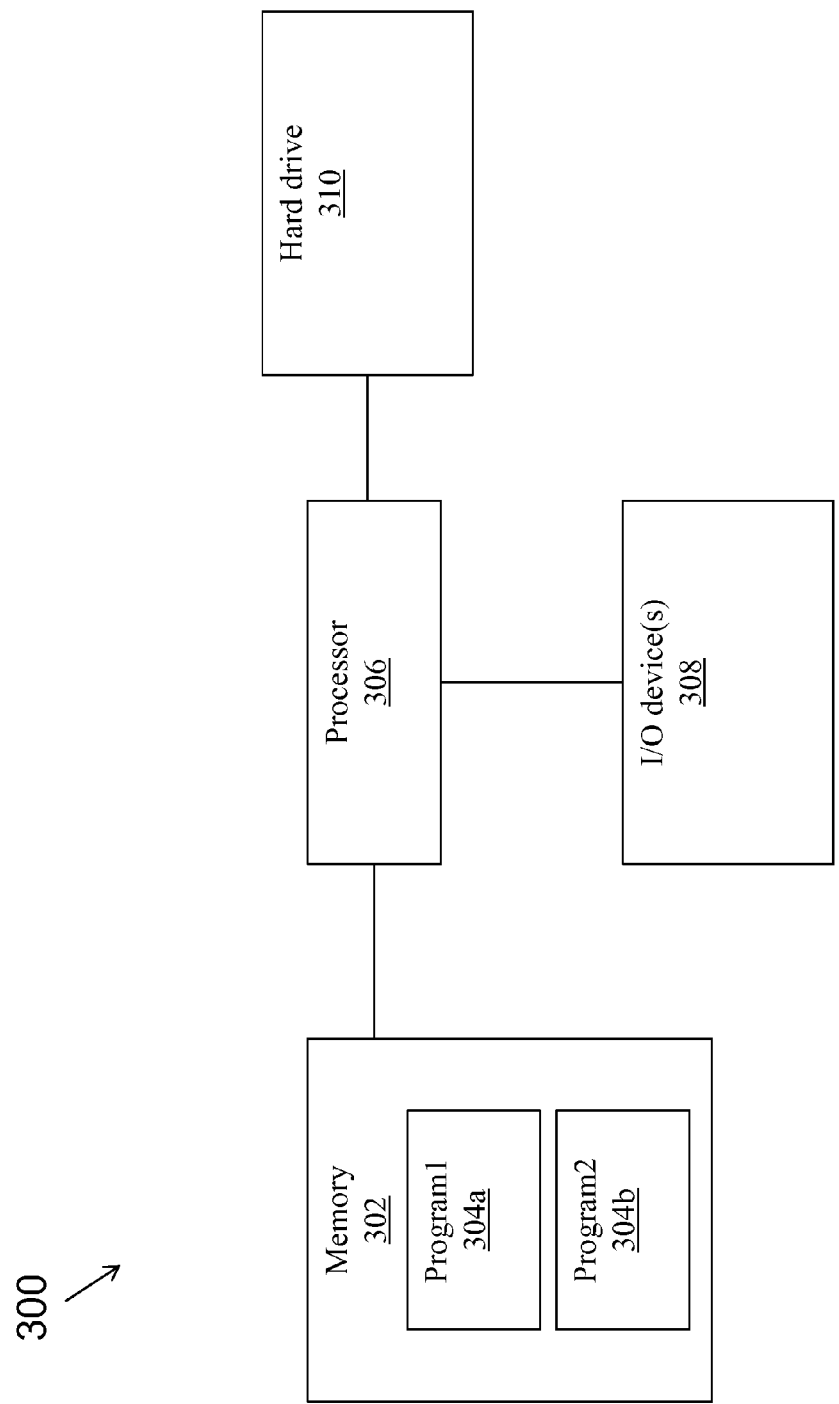

SWITCH-BASED DATA TIERING

DOMESTIC PRIORITY

This application is a continuation of U.S. patent application Ser. No. 14/104,832, filed Dec. 12, 2013, the content of which is incorporated by reference herein in its entirety.

BACKGROUND

The present invention relates generally to computing technology, and more specifically, to data storage in a network.

Data centers may be configured to process large amounts or volumes of data. For example, a server may be coupled to a node or queue that may store data that is needed as part of the processing. The data stored in the node may be "hot" or "super-hot" data, which may be data needed by the server frequently and with short access times in order for the server to carry out all the tasks and functions allocated to it. In this respect, the node may serve as a cache for server data. Conversely, data that is not needed as frequently or that is not needed as quickly by the server (so-called "cold" data) may be stored at a remote location from the server.

In the context of processing data, issues associated with the availability of the data may serve as a bottleneck to network performance. For example, where a rate of requests or tasks received by the server is high, it is impractical to service those requests from the node/cache without degrading performance.

SUMMARY

Embodiments include a method, system, and computer program product for allocating data to storage in a network. A data item accessed by a server in the network is identified. A controller classifies the identified data item based on at least one of: a frequency of access requests for the data item by the server and an access time associated with providing the data item to the server once the server requests the data item. A memory of a switch in the network is selected for storing the data item based on the classification of the data item. The controller causes the data item to be stored in the memory of the switch, from which the data item is accessed by the server upon request.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 3 depicts a computing system environment in accordance with an embodiment.

DETAILED DESCRIPTION

In accordance with one or more embodiments, systems, apparatuses, and methods are described that store frequently accessed data in a memory tier of a network switch (e.g., a Layer 2 or 3 network switch). The memory tier in the network switch is managed and controlled by a controller in coordination with a multi-tier storage access system. The controller identifies frequently accessed data, selects switches in which to store the data, and coordinates with other controllers of a network. The data stored in the network switch is unique in the sense that it is the only instance of the data available. In other words, the data stored in the network switch is not simply being used as a backup or copy of data that is stored at another location.

Figure 1:
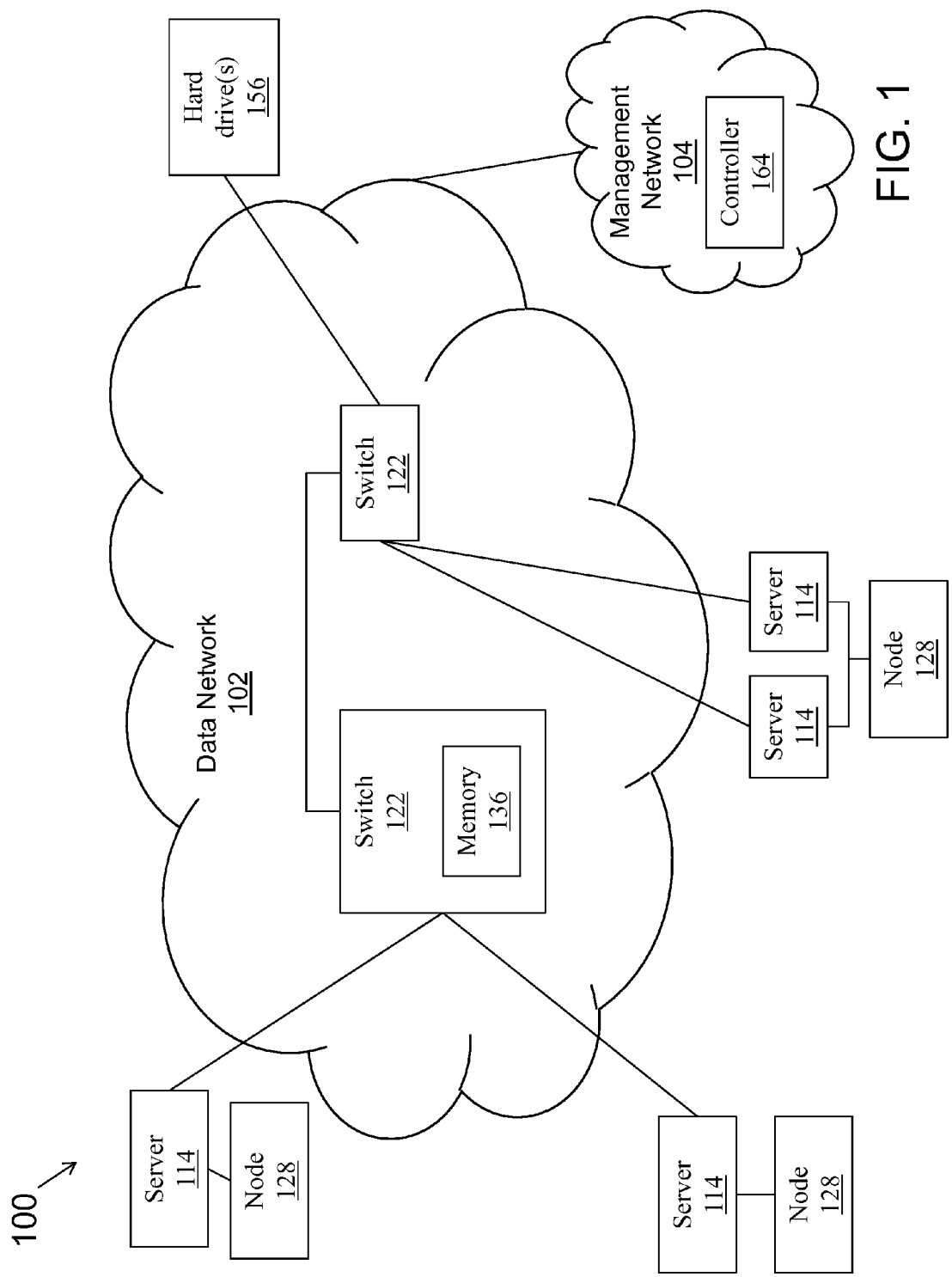
FIG. 1 depicts a computing system environment in accordance with an embodiment.

Turning now to FIG. 1, a computing system 100 is generally shown. The system 100 may be associated with one or more networks, such as a data network 102, a management network 104, etc. The networks may be coupled to one another.

The system 100 may include a number of different types of computing devices. For purposes of illustrative simplicity and ease of explanation, the system 100 is shown as including a number of servers 114 and a number of switches 122. Each of the servers 114 may be associated with, or coupled to, one or more nodes 128. The nodes 128 may function as a cache for storage of data for the server 114.

In some embodiments, the switches 122 may be coupled to one another. For example, data may traverse one or more switches 122, and potentially one or more of the servers 114, as part of a multi-hop path. The switches 122 may be software-defined network (SDN) enabled switches that may support one or more programmable functions or configurations.

A switch 122 may include a memory 136. The memory 136 may be used to store data. In some instances, as described further below, data associated with a server 114 may be stored in the memory 136, potentially as opposed to storing such data into a node 128 associated with the server 114.

The system 100 may include additional storage devices, such as hard drive(s) 156. In some embodiments, the hard drive(s) 156 may be used to store "cold" data with respect to the servers 114. The nodes 128 may be used to store "hot" data with respect to the servers 114. The memory 136 of the switches 122 may be used to store "super-hot" data with respect to the servers 114.

The terms "cold", "hot", and "super-hot" are associated with a temperature rating scale, and merely represent one technique for classifying data based on frequency of access and the time required to access the data. Any other type of classification technique may be used. For example, a numeric rating scale may be used where, e.g., a "10" represents data that needs to be frequently accessed and within a short access time, and a "1" represents data that is infrequently accessed and the access time can be relatively large.

The management network 104 may include a controller 164. The controller 164 may correspond to, or be located on a server (e.g., a server 114). The controller 164 may be coupled to the switches 122 via one or more links (e.g., secure communication links). The controller 164 may be responsible for classifying a given piece or item of data in accordance with a selected classification technique. In this respect, the controller 164 may manage the allocation of data amongst storage (e.g., node 128, memory 136, and hard drive(s) 156) available in the system.

While a single controller 164 is shown in FIG. 1, in some embodiments multiple controllers 164 may be used. The controllers 164 may communicate amongst one another in order to share in the task/burden of managing the network 102.

Figure 2:
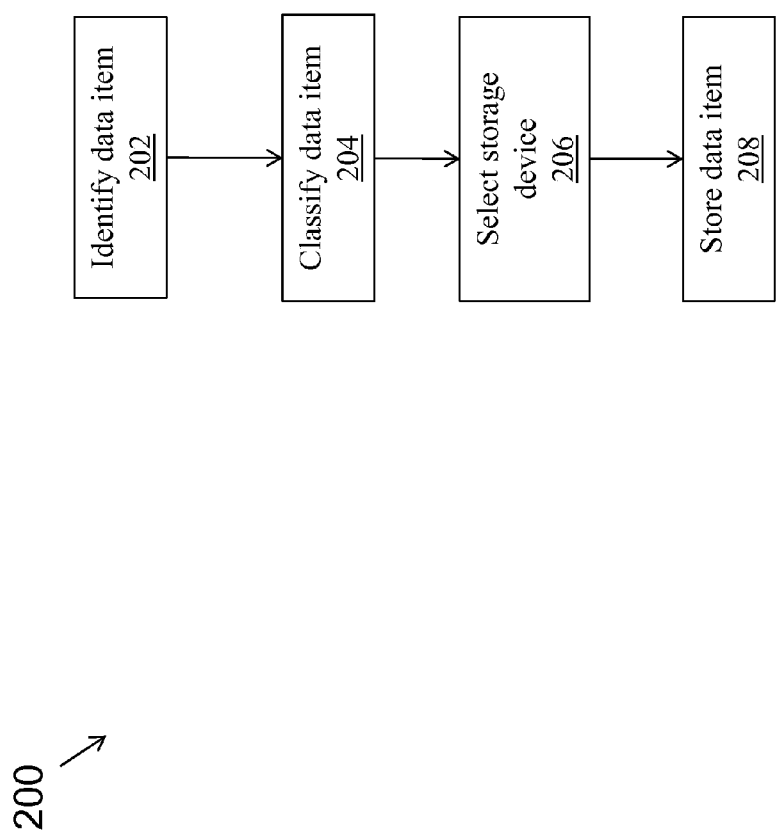
FIG. 2 depicts a process flow for processing a workload in accordance with an embodiment.

Turning to FIG. 2, a flow chart of a method 200 is shown. The method 200 may be executed by one or more systems, devices, or components, such as those described herein. The method 200 may be used to allocate data needed by a server to one or more storage devices.

In block 202, a piece or item of data may be identified. For example, the data may be identified based on one or more tags. Each tag may be unique, such that a first item of data may be distinguished from other items of data in a given network or system.

In block 204, the data item of block 202 may be classified into one or more classes. The classification may be based on how frequently (or infrequently) the data item is needed. The classification may be based on how quickly (or slowly) the data item needs to be available to the server once the server requests the data item.

In block 206, a storage device for storing the data item may be selected. The selection of the storage device may be based on the classification of block 204.

In block 208, the data item may be stored to the storage device selected in block 206.

The method 200 is illustrative. In some embodiments, one or more of the blocks, or a portion thereof, may be optional. In some embodiments, additional blocks or operations not shown may be included. In some embodiments, the blocks may execute in an order or sequence that is different from what is shown in FIG. 2.

The method 200 may be executed more than once for a given data item. For example, the method 200 may be executed periodically to account for changes in system behavior over time. Thus a data item classified as, e.g., "super-hot" may be stored in a first storage device at a first instant in time may be (re-)classified as "hot" at a second instant in time. The re-classification of the data item may cause the data item to be stored in a different storage device (e.g., a second storage device) at the second instant in time; memory cells of the first storage device associated with the data item may be freed at that point, which may allow the memory cells to be over-written.

Referring to FIG. 3, an exemplary computing system 300 is shown. The system 300 is shown as including a memory 302. The memory 302 may store executable instructions. The executable instructions may be stored or organized in any manner and at any level of abstraction, such as in connection with one or more applications, processes, routines, methods, etc. As an example, at least a portion of the instructions are shown in FIG. 3 as being associated with a first program 304a and a second program 304b.

The instructions stored in the memory 302 may be executed by one or more processors, such as a processor 306. The processor 306 may be coupled to one or more input/output (I/O) devices 308. In some embodiments, the I/O device(s) 308 may include one or more of a keyboard or keypad, a touchscreen or touch panel, a display screen, a microphone, a speaker, a mouse, a button, a remote control, a joystick, a printer, etc. The I/O device(s) 308 may be configured to provide an interface to allow a user to interact with the system 300.

The processor 306 may include one or more hard drives 310. The hard drives 310 may be used to store data.

The system 300 is illustrative. In some embodiments, one or more of the entities may be optional. In some embodiments, additional entities not shown may be included. For example, in some embodiments the system 300 may be associated with one or more networks. In some embodiments, the entities may be arranged or organized in a manner different from what is shown in FIG. 3. In some embodiments, at least a portion of the system 300 may be associated with a computing device, such as a controller or a server.

Aspects of the disclosure may be applied in connection with one or more environments. For example, aspects of the disclosure may be used in connection with NoSQL systems and databases. NoSQL systems may be referred to as "Not only SQL" to emphasize that they may allow SQL-like query languages to be used.

Technical effects and benefits include an ability to maximize network performance and reliability by increasing storage device availability for data that is frequently accessed or that is needed within a short access time. This additional storage may already be present in a conventional network and might not require additional, dedicated storage. Memory available in a switch may be used to store "super-hot" data, which may allow an application or program to classify a greater amount of data as "super-hot" relative to conventional techniques. Accordingly, server throughput may be maximized as a result of a reduction in data access time.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for allocating data to storage in a network, wherein the computer implemented method is executed by a processor coupled to a memory to cause the processor to perform:
   identifying a data item accessed by a server in the network to produce an identified data item;
   classifying the identified data item on a temperature rating scale and a numeric rating scale,
   wherein both of the temperature rating scale and the numeric rating scale are based on a frequency of access requests for the identified data item by the server and based on a data access time associated with providing the identified data item to the server,
   wherein the frequency of access requests is a number of requests within a time period,
   wherein the data access time is a duration of time to provide the identified data item in response to an access request from the server, and
   wherein the classifying of the identified data is based on how frequently the identified data item is needed and based on how quickly the identified data item needs to be available to the server once the server requests the identified data item;
   selecting a memory of a switch in the network for storing the identified data item based on the classifying of the identified data item;
   maximizing performance and reliability of the network by storing the identified data item in the memory of the switch to reduce a data access time of the data time in response to a subsequent access request from the server;
   re-classifying the identified data item during a subsequent execution of the program instructions to account for changes in network behavior over time,
   wherein the re-classifying based on both of the temperature rating scale and the numeric rating scale;
   causing the identified data item to be stored in a second memory in response to the re-classifying; and
   freeing memory cells associated with the identified data item in the memory of the switch based on the re-classifying,
   wherein the switch is a layer 2 or 3 network switch.

2. The method of claim 1, wherein the data item is identified by a tag that distinguishes the data item from other data items in the network.

3. The method of claim 1, wherein the controller is configured to classify the data item in accordance with at least one of: a temperature rating scale and a numeric rating scale.

4. The method of claim 1, wherein the network is associated with a NoSQL database.

5. The method of claim 1, wherein the controller is coupled to the switch via a secure communication link.

6. The method of claim 1, wherein the switch is a software-defined network (SDN) enabled switch.

* * * * *